United States Patent
Cao et al.

(10) Patent No.: US 9,842,554 B2
(45) Date of Patent: Dec. 12, 2017

(54) DRIVING CIRCUIT

(71) Applicant: Shenzhen China Star Optoelectronics Technology Co., Ltd., Shenzhen, Guangdong (CN)

(72) Inventors: Dan Cao, Guangdong (CN); Xianming Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 116 days.

(21) Appl. No.: 14/907,536

(22) PCT Filed: Dec. 30, 2015

(86) PCT No.: PCT/CN2015/099779
§ 371 (c)(1),
(2) Date: Jan. 25, 2016

(87) PCT Pub. No.: WO2017/096664
PCT Pub. Date: Jun. 15, 2017

(65) Prior Publication Data
US 2017/0243552 A1    Aug. 24, 2017

(30) Foreign Application Priority Data
Dec. 8, 2015    (CN) .......................... 2015 1 0896526

(51) Int. Cl.
*G09G 3/36*        (2006.01)
*H02M 3/335*      (2006.01)
(Continued)

(52) U.S. Cl.
CPC ........... *G09G 3/3648* (2013.01); *H02M 1/08* (2013.01); *H02M 3/335* (2013.01);
(Continued)

(58) Field of Classification Search
CPC ........... G09G 3/3648; G09G 2330/023; G09G 2310/08; H02M 3/335; H02M 1/08; H02M 2001/0009
See application file for complete search history.

(56) References Cited

U.S. PATENT DOCUMENTS 5,479,333 A * 12/1995 McCambridge ........ H02M 1/36
323/222
6,236,394 B1 * 5/2001 Ikeda ................... G09G 3/3696
345/211
(Continued)

FOREIGN PATENT DOCUMENTS

| CN | 1521724 A | 8/2004 |
|---|---|---|
| CN | 202008814 U | 10/2011 |

(Continued)

*Primary Examiner* — Ilana Spar
*Assistant Examiner* — Brent D Castiaux
(74) *Attorney, Agent, or Firm* — Andrew C. Cheng

(57) ABSTRACT

The present disclosure provides driving circuit used to a liquid crystal display, which includes a boost module, a power management module, a power detection module and a micro controller unit, the power management module is connected to the boost module and the micro controller unit, the boost module, the power detection module and the micro controller unit are connected in sequence, the power detection module detects an output power of the boost module, and the micro controller unit switches a working mode of the boost module according to the output power. The driving circuit of the present disclosure may select different working modes according to a magnitude of the output power, so as to distribute the power and increase the efficiency, thus it may effectively solve the problem of lower efficiency and higher temperature of the component under the high power condition.

8 Claims, 2 Drawing Sheets

(51) Int. Cl.
　　*H02M 1/08*　　　(2006.01)
　　*H02M 1/00*　　　(2006.01)
(52) U.S. Cl.
　　CPC ... *G09G 2310/08* (2013.01); *G09G 2330/023* (2013.01); *H02M 2001/0009* (2013.01)

(56) References Cited

U.S. PATENT DOCUMENTS

| | | | |
|---|---|---|---|
| 8,638,051 | B2 | 1/2014 | Kwon |
| 2008/0036529 | A1* | 2/2008 | Ishiyama ............... H02M 3/07 327/536 |
| 2009/0079495 | A1* | 3/2009 | Morita .................... H02M 3/07 327/538 |
| 2015/0042925 | A1 | 2/2015 | Hu et al. |

FOREIGN PATENT DOCUMENTS

| | | | |
|---|---|---|---|
| CN | 102394039 | A | 3/2012 |
| CN | 203086782 | U | 7/2013 |
| CN | 103280191 | A | 9/2013 |
| CN | 104008735 | A | 8/2014 |
| CN | 204268235 | U | 4/2015 |
| CN | 104682699 | A | 6/2015 |
| CN | 105093598 | | 11/2015 |

* cited by examiner

DRIVING CIRCUIT

CROSS-REFERENCE TO RELATED APPLICATIONS

This application claims the benefit of, and priority to, Chinese Patent Application No. 201510896526.7, filed Dec. 8, 2015, titled "driving circuit", the entire contents of which are incorporated by reference herein in its entirety.

FIELD OF THE INVENTION

The present disclosure is related to liquid crystal display technology field, and more particular to a driving circuit used to a liquid crystal display.

BACKGROUND OF THE INVENTION

A driving circuit of the existing DC-DC converter generally adopts a single way boost, and the temperature of part of the components is higher under the high power condition. However, when the driving circuit adopts a simple multi-way boost, the temperature of the components may be lowered, but the cost of the control chip may be increased accordingly.

SUMMARY OF THE INVENTION

The present disclosure provides a driving circuit, which may select different working modes according to a magnitude of the output power of the boost module, so as to distribute the power and increase the efficiency. Thus it may effectively solve the problem of lower efficiency and higher temperature of the component under the high power condition, and does not increase the cost of the control chip.

The present disclosure provides a driving circuit used to a liquid crystal display. The driving circuit includes a boost module, a power management module, a power detection module and a micro controller unit, the power management module is connected to the boost module and the micro controller unit, the boost module, the power detection module and the micro controller unit are connected in sequence, the power detection module detects an output power of the boost module, and the micro controller unit switches a working mode of the boost module according to the output power.

In one embodiment, the micro controller unit includes a first threshold power and a second threshold power, wherein the first threshold power is less than the second threshold power, the boost module has a first working mode, a second working mode and a third working mode; when the output power is less than the first threshold power, the micro controller unit switches the boost module to the first working mode; when the output power is greater than the first threshold power and is less than the second threshold power, the micro controller unit switches the boost module to the second working mode; when the output power is greater than the second threshold power, the micro controller switches the boost module to the third working mode.

In one embodiment, the boost module includes a first boost sub module, a second boost sub module, a third boost sub module and a fourth boost sub module, each of the boost sub modules includes a first switch, a second switch, an inductor, a diode and a first resistor; the first switch includes a terminal for connecting a power source and the other terminal for connecting to the second switch through the inductor, the second switch includes a terminal for connecting to the inductor and the other terminal for connecting to a ground through the first resistor, the diode includes a terminal for connecting between the first switch and the inductor and the other terminal for forming an output terminal, the first switch is connected to the micro controller unit, and the second switch is connected to the power management module.

In one embodiment, the first switch is a N channel metal oxide semiconductor (MOS) transistor, the second switch is a P channel MOS transistor; the first switch includes a source for connecting to the power source, a gate for connecting the micro controller unit and a drain for connecting to the second switch through the inductor; the second switch includes a source for connecting to the ground through the first resistor, a gate for connecting to the power management module and a drain for connecting to the drain of the first switch.

In one embodiment, when the boost module is at the first working mode, the first switches of the first boost sub module and the third boost sub module are turned off, and the first switches of the second boost sub module and the fourth boost sub module are turned on; when the boost module is at the second working mode, the first switches of the first boost sub module to the third boost sub module are turned on, and the first switch of the fourth boost sub module are turned off; when the boost module is at the third working mode, the first switches of the first boost sub module to the fourth boost sub module are turned on.

In one embodiment, the power management module includes a ground pin, a driving pin, a current detection pin and a current output pin, wherein the ground pin is connected to the ground, the driving pin is respectively connected to the second switch of the boost sub module and controls the second switch to turn on and turn off, so as to control the corresponding diode to turn on or turn off; the current detection pin is connected between the second switch and the first resistor of the boost sub module to detect a current magnitude flowing through the first resistor, and the current control pin is connected to the micro controller unit and provides a current to the micro controller unit.

In one embodiment, the power detection module includes a current detection module and a multiplier connected to the current detection module, wherein the current detection module detects an output current of the boost module, the multiplier multiplies the output current and an output voltage of the boost module to obtain the output power of the boost module, and transmits the output power to the micro controller unit.

In one embodiment, the current detection module is a photoelectric coupler.

In one embodiment, the photoelectric coupler includes a first terminal, a second terminal, a third terminal and a fourth terminal, the first terminal is connected to the diode of the boost sub module, the second terminal is connected to the output terminal, the third terminal is connected to the power source through a second resistor, the fourth terminal is connected to the ground through a third resistor, and the multiplier includes a terminal for connecting the third terminal to obtain a current detected by the photoelectric coupler and the other terminal for obtaining the output voltage of the boost module to obtain the output power of the boost module after a multiplication operation.

In one embodiment, the micro controller unit includes a power pin, a switch control pin and a current pin, wherein the power pin is connected to the power detection module to obtain a power detected by the power pin, the switch control pin is connected to the first switch of the boost sub module, and controls the first switch to turn on or turn off, so as to switch a working mode of the boost module.

Compared with the prior art, the driving circuit of the present disclosure may select different working modes according to a magnitude of the output power of the boost module, so as to distribute the power and increase the efficiency. Thus it may effectively solve the problem of lower efficiency and higher temperature of the component under the high power condition.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION

Figure 1:
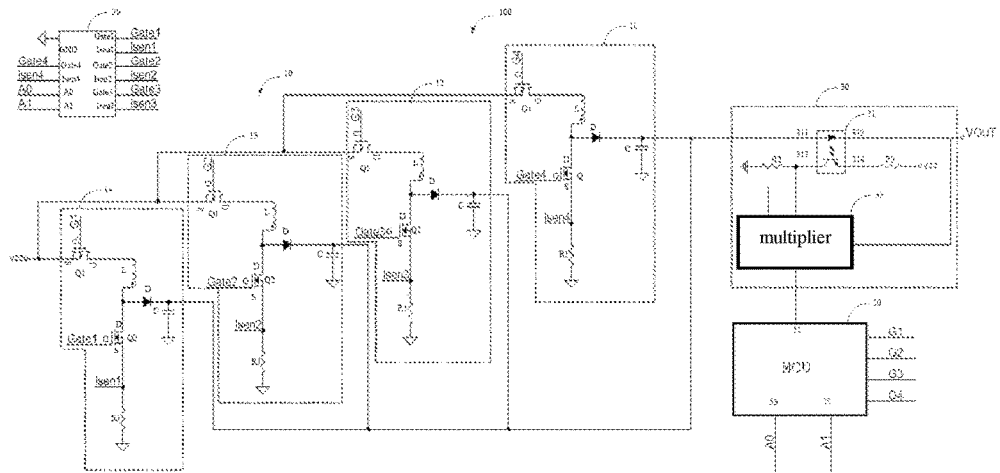
FIG. 1 is a circuit diagram of a driving circuit according to an embodiment of the present disclosure.

The following description with reference to the accompanying drawings is provided to clearly and completely explain the exemplary embodiments of the present disclosure. It is apparent that the following embodiments are merely some embodiments of the present disclosure rather than all embodiments of the present disclosure. According to the embodiments in the present disclosure, all the other embodiments attainable by those skilled in the art without creative endeavor belong to the protection scope of the present disclosure.

In addition, the following description of the embodiments refers to the additional accompanying drawings, so as to the particular embodiment may be implemented by the present disclosure. The direction term mentioned by the present disclosure, such as "upper", "lower", "front", "rear", "left", "right", "inside", "outside", "side," etc, only refers to the direction of the accompanying drawings. Therefore, the direction terms are used better and more clearly explain and understand the present disclosure, rather than indicating or alluding that the indicated device or component must have a particular orientation, and constructs or operates in a particular orientation, but it may not be understood as limitation of the present disclosure.

In the description of the present disclosure, it should be explained that unless otherwise expressly specified and limited, the term "install", "connect", "connection" should be broadly understood, for example, it may be fixedly connected, may also be removably connected or integrally connected; it may be mechanically connected; it may be directly connected, or indirectly connected through the intermediary and it may be a connection of two internal elements. For those of ordinary skill in the art, it can be understood that the specific circumstances of the above terms in the present disclosure.

In addition, in the description of the present disclosure, unless otherwise specified, "plurality" means two or more than two. If the term "step" appears in the specification, it not only means an independent step, when it does not clearly distinguished with other steps, the expected effect realized as long as by this step is also included in this term. Furthermore, in the specification, a number range indicated by "–" is a range including the numbers described before and after "–" and served as a minimum value and a maximum value. In the accompanying drawings, the similar structure or the same unit is represented by the same reference numeral.

Please refers to FIG. 1. FIG. 1 is a circuit diagram of a driving circuit according to an embodiment of the present disclosure. As shown in FIG. 1, the driving circuit 100 used to a liquid crystal display, which includes a boost module 10, a power management module 20, a power detection module 30 and a micro controller unit (MCU) 50. The power management module 20 is connected to the boost module 10 and the micro controller unit 50, the boost module 10, the power detection module 30 and the micro controller unit 50 are connected in sequence, the power detection module 30 detects a output power of the boost module 10, and the micro controller unit 50 switches a working mode of the boost module 10 according to the output power.

The micro controller unit 50 includes a boost sub module 11, so as to form a multi-way boost structure. In the embodiment, the micro controller unit 50 includes four boost sub modules, which are a first boost sub module 11, a second boost sub module 12, a third boost sub module 13 and a fourth boost sub module 14. Each of the boost sub modules includes a first switch Q1, a second switch Q2, an inductor L, a diode D, a capacitor C and a first resistor R1. The first switch Q1 includes a terminal for connecting a power source VCC and the other terminal for connecting to the second switch Q2 through the inductor L, the second switch Q2 includes a terminal for connecting to the inductor L and the other terminal for connecting to a ground through the first resistor R1, the diode D includes a terminal for connecting between the first switch Q1 and the inductor L and the other terminal for forming an output terminal VOUT, the first switch Q1 is connected to the micro controller unit 50 and the second switch Q2 is connected to the power management module 20. The diode D may be a backlight module of the liquid crystal display, and when the diode D is conducted, the liquid crystal display is lighted.

In the embodiment, the first switch Q1 is a N channel metal oxide semiconductor (MOS) transistor, and the second switch Q2 is a P channel MOS transistor. The first switch Q1 includes a source S for connecting to the power source VCC, a gate G for connecting the micro controller unit 50 and a drain D for connecting to the second switch Q2 through the inductor L. The second switch Q2 includes a source S for connecting to the ground through the first resistor R1, a gate G for connecting to the power management module 20 and a drain D for connecting to the drain D of the first switch Q1. A terminal of the diode D is connected to the drain D of the first switch Q1 and the drain D of the second switch Q2 and the other terminal of the diode is connected to the power detection module 30 and is connected to the ground through the capacitor at the same time. It should be understood that the capacitor may be omitted.

In the embodiment, the boost module 10 includes a first working mode, a second working mode and a third working mode, wherein when the boost module 10 is at the first working mode, the first switch Q1 of the first boost sub module 11 and the first switch Q1 of the third boost sub module 13 are turned off, and the first switch Q1 of the second boost sub module 12 and the first switch Q1 of the fourth boost sub module 14 are turned on; when the boost module 10 is at the second working mode, the first switches Q1 of the first boost sub module 11 to the third boost sub module 13 are turned on, and the first switch Q1 of the fourth boost sub module 14 are turned off; when the boost module 10 is at the third working mode, the first switches Q1 of the first boost sub module 11 to the fourth boost sub module 14 are turned on. It should be understood that a quantity of the working mode of the boost module 10 may be correspondingly increased or decreased according to a quantity of the boost sub module increased or decreased.

The power management module 20 includes a ground pin GND, driving pins Gate1 to Gate4, current detection pins lsen1 to lsen4 and a current output pins A0, A1. The ground pin GND is connected to the ground. The driving pins Gate1 to Gate4 are respectively connected to the second switches Q2 of the four boost sub module 11. In the embodiment, the driving pins Gate1 to Gate4 are respectively connected to the drains D of the second switches Q2 of the four boost sub modules 11 and control the second switches Q2 to turn on and turn off, so as to control the corresponding diodes D to turn on or turn off. The current detection pins lsen1 to lsen4 are connected between the sources S of the second switches Q2 and the first resistor R1 of the four boost sub modules 11 to detect a current magnitude flowing through the first resistor R1. The current control pins A0, A1 are connected to the micro controller unit 50 and provides a current to the micro controller unit 50.

The power detection module 30 includes a current detection module 31 and a multiplier 33 connected to the current detection module 31. The current detection module 31 detects an output current of the boost module, the multiplier 33 multiplies the output current and an output voltage of the boost module 10 to obtain the output power of the boost module 10, and transmits the output power to the micro controller unit 50. The output voltage of the boost module 10 may be provided to the multiplier 33 by the micro controller unit 50.

In the embodiment, the current detection module 31 is a photoelectric coupler 31. The photoelectric coupler 31 is used to detect the output currents flowing through the four boost sub modules 11. The photoelectric coupler 31 includes a first terminal 311, a second terminal 312, a third terminal 313 and a fourth terminal 314. The first terminal 311 is connected to the diodes D of the four boost sub module 11. The second terminal 312 is connected to the output terminal VOUT. The third terminal 313 is connected to the power source VCC through a second resistor R2. The fourth terminal 314 is connected to the ground through a third resistor R3. The multiplier 33 includes a terminal for connecting the third terminal 313 to obtain a current detected by the photoelectric coupler 31 and the other terminal for obtaining a voltage coefficient to obtain the output power of the boost module after a multiplication operation.

The micro controller unit 50 includes a power pin 51, switch control pins G1 to G4 and current pins 53, 55. The power pin 51 is connected to the power detection module 33 to obtain a power detected by the power pin 51. The switch control pins G1 to G4 are respectively connected to the gates G of the first switches Q1 of the four boost sub module 11, 12, 13, 14, which is used to output a control signal to control the first switches Q1 to turn on or turn off, so as to switch a working mode of the boost module 10. The current pins 53,55 are connected to the current output pins A0, A1 of the power management module 10. In the embodiment, the micro controller unit 50 includes a first threshold power and a second threshold power, wherein the first threshold power is less than the second threshold power, and the micro controller unit 50 switches the working mode of the boost module 10 according to a magnitude of the output power, a magnitude of the first threshold power and a magnitude of the second threshold power.

Figure 2:
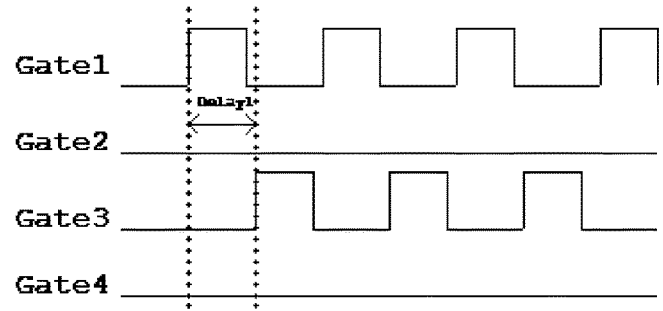
FIG. 2 is a timing diagram of a control signal outputted by a micro controller unit when a boost circuit of a driving circuit is at a first working mode according to an embodiment of the present disclosure.
Figure 3:
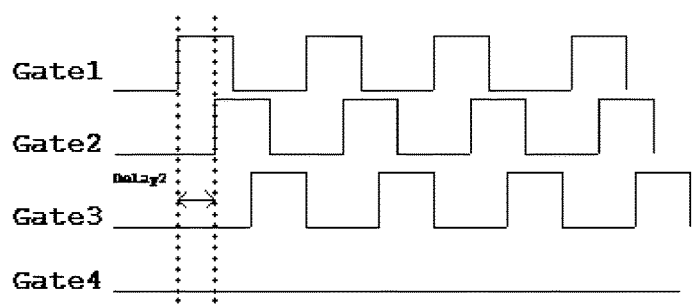
FIG. 3 is a timing diagram of a control signal outputted by a micro controller unit when a boost circuit of a driving circuit is at a second working mode according to an embodiment of the present disclosure.
Figure 4:
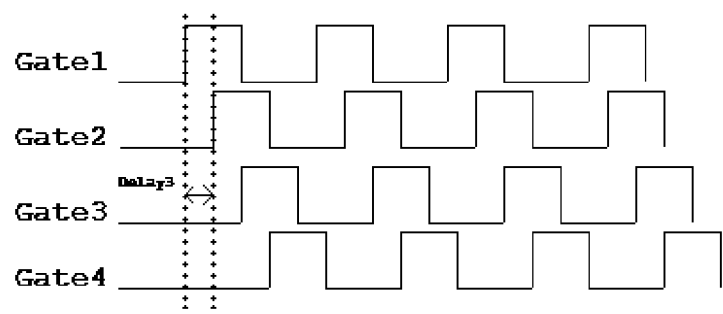
FIG. 4 is a timing diagram of a control signal outputted by a micro controller unit when a boost circuit of a driving circuit is at a third working mode according to an embodiment of the present disclosure.

When the boost circuit of the present disclosure works, the photoelectric coupler 31 detects the output current of the boost module 10 and the output current is calculated by the multiplier 33 to obtain the output power. The micro controller unit 50 switches the working mode of the boost module 10 according to a magnitude of the output power. When the output power is less than the first threshold power, the micro controller unit 50 switches the boost module 10 to the first working mode. Specifically, please refers to FIG. 2, the switch control pins G1 to G4 respectively output the control signals Gate1 to Gate4, wherein the control signal Gate1 and Gate3 have a first delay time D1 and are low level, such that the first switches Q1 of the first boost sub module 11 and the third boost sub module 13 is turned off, and the first switches Q1 of second boost sub module 12 and the fourth boost sub module 14. When the output power is greater than the first threshold power and is less than the second threshold power, the micro controller unit 50 switches the boost module to the second working mode. Specifically, please refers to FIG. 3, the switch control pins G1 to G4 respectively output the control signals Gate1 to Gate4, wherein the control signals Gate1, Gate2 have a second delay time D2 and the control signals Gate1, Gate2 and Gate3 are low level, such that the first switches Q1 of the first boost sub module 11, the second boost sub module 12 and the third boost sub module 13 are turned on, and first switches Q1 of the fourth boost sub module 14 is turned off. When the output power is greater than the second threshold power, the micro controller 50 switches the boost module 10 to the third working mode. Specifically, please refers to FIG. 4, the switch control pins G1 to G4 respectively output the control signals Gate1 to Gate4, wherein the control signal Gate1, Gate2 have a third delay time Delay3 and the control signal Gate1 to Gate4 are low level, such that the first switches Q1 of the first boost sub module 11, the second boost sub module 12, the third boost sub module 13 and the fourth boost sub module 14 are turned on.

In summary, the driving circuit 100 of the embodiment of the present disclosure may select different working modes according to a magnitude of the output power of the boost module 10, so as to distribute the power and increase the efficiency, thus it may effectively solve the problem of lower efficiency and higher temperature of the component under the high power condition, and does not increase the cost of the control chip.

In the description of the specification, the description of the reference term "one embodiment," "some embodiments," "example," "specific example," or "some example" means that a particular feature, structure, material or characteristic described by the embodiment are combined to be included in at least one embodiment or example of present disclosure. In the specification, the schematic representation of the above term is not necessarily referring to the same embodiment or example. The described particular feature, structure, material or characteristic may be combined in an appropriate manner in any one or more embodiment or example.

The above present disclosure is merely an embodiment of the present disclosure and does not intend to limit the claim scope of the present disclosure. Those having ordinary knowledge in the related art may realize all or part of the process to achieve the above embodiments and may conduct equivalent variation on the claims of the present disclosure, which belongs to the scope covered by the present disclosure.

What is claimed is:

1. A driving circuit of a liquid crystal display, wherein the driving circuit comprises a boost module, a power management module, a power detection module and a micro controller unit, the power management module is connected to the boost module and the micro controller unit, the boost module, the power detection module and the micro controller unit are connected in sequence, the power detection module detects an output power of the boost module, and the micro controller unit switches a working mode of the boost module according to the output power;

wherein the micro controller unit comprises a first threshold power and a second threshold power, wherein the first threshold power is less than the second threshold power, the boost module has a first working mode, a second working mode and a third working mode; when the output power is less than the first threshold power, the micro controller unit switches the boost module to the first working mode; when the output power is greater than the first threshold power and is less than the second threshold power, the micro controller unit switches the boost module to the second working mode; when the output power is greater than the second threshold power, the micro controller switches the boost module to the third working mode; and wherein the boost module comprises a first boost sub module, a second boost sub module, a third boost sub module and a fourth boost sub module, each of the boost sub modules comprises a first switch, a second switch, an inductor, a diode and a first resistor; the first switch comprises a terminal for connecting a power source and the other terminal for connecting to the second switch through the inductor, the second switch comprises a terminal for connecting to the inductor and the other terminal for connecting to a ground through the first resistor, the diode comprises a terminal for connecting between the first switch and the inductor and the other terminal for forming an output terminal, the first switch is connected to the micro controller unit, and the second switch is connected to the power management module.

2. The driving circuit according to claim 1, wherein the first switch is a N channel metal oxide semiconductor (MOS) transistor, the second switch is a P channel MOS transistor; the first switch comprises a source for connecting to the power source, a gate for connecting the micro controller unit and a drain for connecting to the second switch through the inductor; the second switch comprises a source for connecting to the ground through the first resistor, a gate for connecting to the power management module and a drain for connecting to the drain of the first switch.

3. The driving circuit according to claim 1, wherein when the boost module is at the first working mode, the first switches of the first boost sub module and the third boost sub module are turned off, and the first switches of the second boost sub module and the fourth boost sub module are turned on; when the boost module is at the second working mode, the first switches of the first boost sub module to the third boost sub module are turned on, and the first switch of the fourth boost sub module are turned off; when the boost module is at the third working mode, the first switches of the first boost sub module to the fourth boost sub module are turned on.

4. The driving circuit according to claim 1, wherein the power management module comprises a ground pin, a driving pin, a current detection pin and a current output pin, wherein the ground pin is connected to the ground, the driving pin is respectively connected to the second switch of the boost sub module and controls the second switch to turn on and turn off, so as to control the corresponding diode to turn on or turn off; the current detection pin is connected between the second switch and the first resistor of the boost sub module to detect a current magnitude flowing through the first resistor, and the current control pin is connected to the micro controller unit and provides a current to the micro controller unit.

5. The driving circuit according to claim 1, wherein the power detection module comprises a current detection module and a multiplier connected to the current detection module, wherein the current detection module detects an output current of the boost module, the multiplier multiplies the output current and an output voltage of the boost module to obtain the output power of the boost module, and transmits the output power to the micro controller unit.

6. The driving circuit according to claim 5, wherein the current detection module is a photoelectric coupler.

7. The driving circuit according to claim 6, wherein the photoelectric coupler comprises a first terminal, a second terminal, a third terminal and a fourth terminal, the first terminal is connected to the diode of the boost sub module, the second terminal is connected to the output terminal, the third terminal is connected to the power source through a second resistor, the fourth terminal is connected to the ground through a third resistor, and the multiplier comprises a terminal for connecting the third terminal to obtain a current detected by the photoelectric coupler and the other terminal for obtaining the output voltage of the boost module to obtain the output power of the boost module after a multiplication operation.

8. The driving circuit according to claim 4, wherein the micro controller unit comprises a power pin, a switch control pin and a current pin, wherein the power pin is connected to the power detection module to obtain a power detected by the power pin, the switch control pin is connected to the first switch of the boost sub module, and controls the first switch to turn on or turn off, so as to switch a working mode of the boost module.

* * * * *